United States Patent [19]

Lechner

[11] 4,284,853

[45] Aug. 18, 1981

[54] TELECOMMUNICATION SUBSCRIBER LINE ACCESS CIRCUIT WITH GROUND KEY INDICATION AND A DEVICE FOR CALL SIGNAL GENERATION

[75] Inventor: Robert Lechner, Otterfing, Fed. Rep. of Germany

[73] Assignee: Siemens Aktiengesellschaft, Berlin and Munich, Fed. Rep. of Germany

[21] Appl. No.: 127,838

[22] Filed: Mar. 6, 1980

[30] Foreign Application Priority Data

Mar. 23, 1979 [DE] Fed. Rep. of Germany ....... 2911584

[51] Int. Cl.$^3$ .............................................. H04M 3/02
[52] U.S. Cl. .......................... 179/18 HB; 179/18 FA
[58] Field of Search ........... 179/18 HB, 18 F, 18 FA, 179/81 R, 81 C, 84 R, 84 C, 16 F, 18 B, 18 A, 18 AF, 18 H

[56] References Cited

U.S. PATENT DOCUMENTS

| | | | |
|---|---|---|---|
| 4,099,032 | 7/1978 | Roge et al. ....................... | 179/18 HB |
| 4,140,882 | 2/1979 | Regan et al. ..................... | 179/18 HB |

*Primary Examiner*—Thomas A. Robinson
*Attorney, Agent, or Firm*—Spellman, Joel & Pelton

[57] ABSTRACT

A subscriber line access circuit for use in a telecommunications system is disclosed. The subscriber line access circuit includes a power supply bridge in the form of a first resistor inserted in the b-wire (ground potential side) of a subscriber line, a second resistor inserted in the a-wire (supply potential side) of the subscriber line, and a capacitor which bridges the two wires at the terminals of the two resistors on the sides thereof opposite to the respective potential sources. This supply bridge is coupled on the capacitor side with a two-to-four wire hybrid transformer for the two-wire/four-wire transition to the system and includes an evaluating circuit which delivers an indicating signal when the subscriber actuates a ground key. A cutoff circuit is arranged in the power supply bridge between the first and/or second resistor in that bridge and the respective one or ones of the transformer windings at the junction points at which the evaluating circuit is connected. The device for generating call signals is connected to one of these junction points via a coupling contact and a series resistance. The associated cutoff contact of the supply bridge and the coupling contact of the call signal generating device are controlled in such a way that they can be closed only alternatively.

3 Claims, 1 Drawing Figure

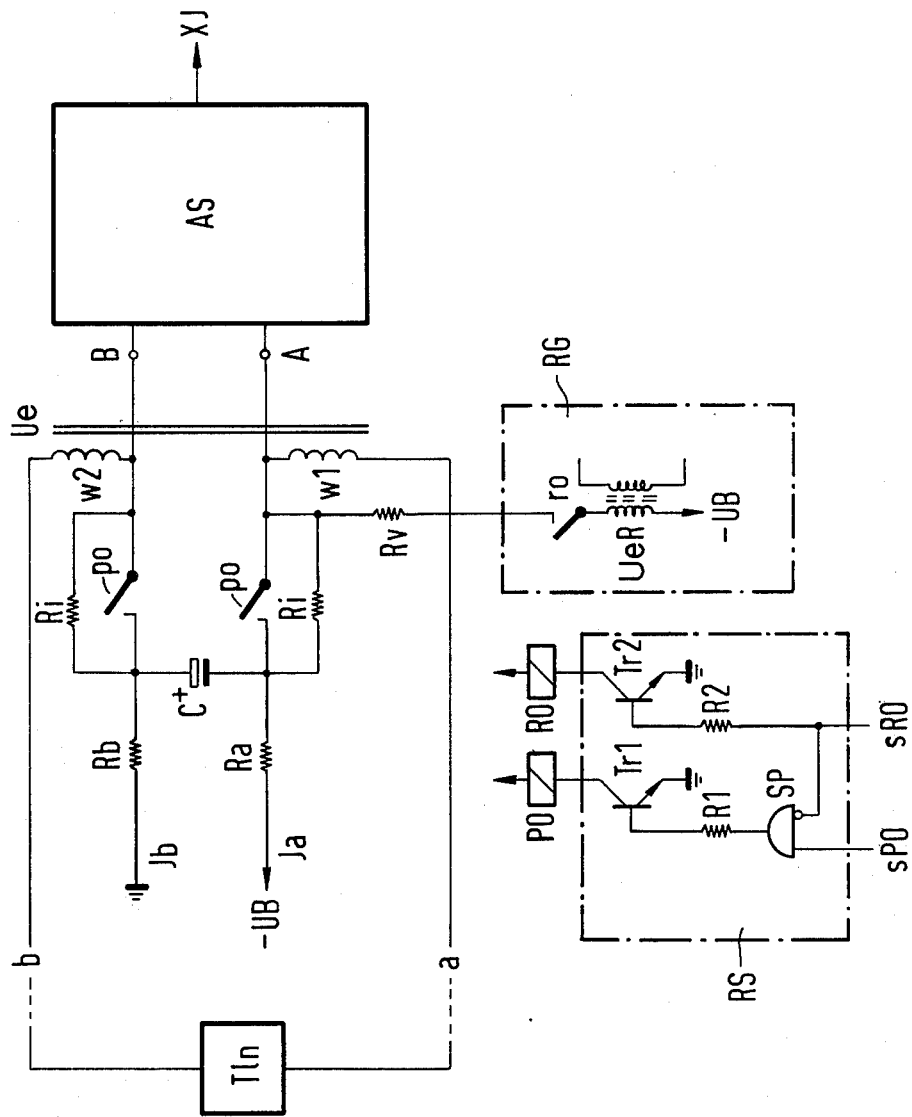

TELECOMMUNICATION SUBSCRIBER LINE ACCESS CIRCUIT WITH GROUND KEY INDICATION AND A DEVICE FOR CALL SIGNAL GENERATION

BACKGROUND OF THE INVENTION

The present invention relates to a subscriber line access circuit for use in a telecommunications system. The subscriber line access circuit includes a power supply bridge in the form of a first resistor inserted in the b-wire (ground potential side) of a subscriber line, a second resistor inserted in the a-wire (supply potential side) of the subscriber line, and a capacitor which bridges the two wires at the terminals of the two resistors on the sides thereof opposite to the respective potential sources. This supply bridge is coupled on the capacitor side with a two-to-four wire hybrid transformer for the two-wire/four-wire transition to the system and includes an evaluating circuit which delivers an indicating signal when the subscriber actuates a ground key.

The subscriber line access circuit also includes a cutoff circuit arranged in the power supply bridge in series with at least one of the two resistors. The cutoff circuit is provided with a cutoff switch, bridged by a high valued resistor, which is opened, after a delay, upon ground key actuation of the subscriber, and closed upon termination of the ground key actuation. Also included in the subscriber line access circuit is a device for call signal generation. With such a cutoff circuit it is possible to avoid damage to circuit elements in the remaining part of the power supply bridge due to increased current flow upon ground key actuation of the subscriber which exceeds a prescribed length of time.

It has been proposed to insert this cutoff circuit into the a-wire of the subscriber line and to bridge it with a resistor having a sufficiently high resistance value that, with the cutoff switch open, the residual current flowing through it due to ground key actuation does not damage the circuit components lying in the affected portion of the access circuit and having a sufficiently low resistance value that the current flowing through it, without ground key actuation and due to a leakage current between the wires of the subscriber line in excess of a permitted limit value, causes the evaluating circuit to respond in the same manner as with a closed cutoff switch and simultaneous ground key actuation. In this way, it is possible to test the subscriber line for insulation faults at no extra cost in equipment by utilizing for this test the evaluating circuit provided for indication of ground key actuation.

When coupling a device for generating call signals to the subscriber line access circuit, a DC voltage as well as a superimposed AC signal at the call audio frequency are applied to the subscriber line. This DC voltage and AC signal are repeatedly connected to the access circuit in accordance with the signal-to-interval ratio of the particular call. In order to prevent the current originating from the power supply from completely compensating or cancelling the current resulting from the DC voltage, it is necessary to cut off the supply current source simultaneously with the application of the DC voltage as the device for generating a call signal is switched in. For this reason, it has been the practice to provide a reversing switch for the device for generating a call signal.

An object of the present invention is to simplify the arrangement for switching the device for generating a call signal into a subscriber line access circuit of the type described above.

SUMMARY OF THE INVENTION

This object, as well as other objects which will become apparent from the discussion that follows, are achieved, according to the present invention, by arranging the cutoff circuit in the power supply bridge between the first and/or second resistor in that bridge and the respective one or ones of the transformer windings at the junction points at which the evaluating circuit is connected. In addition, the device for generating call signals is connected to one of these junction points via a coupling contact and a series resistance. The associated cutoff contact of the supply bridge and the coupling contact of the call signal generating device are then controlled in such a way that they can be closed only alternatively.

In accordance with the invention, it is thus possible to utilize a cutoff contact which is already present in the power supply bridge in connection with the coupling of the call signal generating device to effect the high resistance switching of the power supply bridge. In this way, the call signal generating device need not comprise a reversing switch contact as in the prior system described above; rather, a simple coupling contact is sufficient. The position of the cutoff contact provided in the power supply bridge—namely, between the supply bridge resistor and the junction point of the evaluating circuit—assures that the current which flows upon connection of the call signal generating device not only remains largely unaffected by the supply current but is also prevented from leaking off across the capacitor of the supply bridge.

A preferred embodiment of this invention will now be described, by way of example, with reference to the accompanying drawing.

BRIEF DESCRIPTION OF THE DRAWING

The single FIGURE is a schematic diagram of a portion of a subscriber line access circuit, to the extent necessary for understanding the invention.

DESCRIPTION OF THE PREFERRED EMBODIMENT

The FIGURE shows a subscriber line access circuit to the extent required for understanding the invention. A component part of this subscriber line access circuit is a power supply bridge which consists of a first resistance Ra inserted in the a-wire of the subscriber line (at supply potential -UB), a second resistance Rb inserted in the b-wire of the subscriber line (at ground potential), and a capacitor C which bridges the two wires of the subscriber line at terminals of the two resistances Ra and Rb on the sides opposite to the respective supply potential sources. On the capacitor side the supply bridge is connected to the windings w1 and w2 inserted in the a-wire and b-wire, respectively, of a two-to-four wire hybrid transformer Ue. The transformer windings forming the four-wire side are not shown in the figure.

The subscriber line access circuit further comprises an evaluating circuit AS, whose inputs A and B are connected at the junctions of the power supply bridge to the windings w1 and w2 of the transformer Ue. As has been mentioned, the evaluating circuit serves to indicate when a ground key at the subscriber station has been actuated or, alternatively, in the case of testing for faulty insulation, when the current flowing between the two wires of the subscriber line exceeds a given limit value. The structure and operation of this evaluating circuit are shown and described in the copending and commonly-owed application of Robert Lechner, Ser. No. 127,569 filed Mar. 6, 1980.

In the embodiment shown, a first cutoff contact po is inserted into the a-wire of the subscriber line between resistor Ra and the winding w1. A second identical cutoff contact po is arranged in the b-wire between resistance Rb and the winding w2. These contacts are bridged by high valued resistors Ri. In the calling state, the cutoff contacts serve to switch the supply circuit to high resistivity when a ground key actuation, detected by the evaluating circuit AS, continues for a given length of time. The resistance value of Ri is chosen to be sufficiently high that, with the cutoff switch open, the residual current flowing through it due to ground key actuation does not damage the circuit components lying in the affected portion of the supply circuit. The resistance of this resistor is also chosen to be sufficiently low that the current flowing through it without ground key actuation and due to a leakage current between the wires of the subscriber line in excess of the permitted value causes the evaluating circuit to respond, in the same manner as without a closed cutoff switch and simultaneous ground key actuation, to indicate the presence of faulty insulation.

The illustrated circuit arrangement is furthermore provided with a device RG for call signal generation, of which only a transformer UeR is shown in the figure. One side of the secondary winding of the transformer is connected to the potential −UB while the other side is connected by means of a coupling contact ro via a resistance RV to the a-wire of the subscriber line, namely at the same point where also the coupling contact po is connected with the winding w1 of the transformer Ue. In a manner well known in the art, an AC voltage at the call audio frequency is supplied to the primary winding of the transformer UeR of the device RG.

A relay control circuit RS is provided for control of the coupling contact ro in the call generator RG and of the cutoff contact po via the relays RO and PO, respectively, to which these two contacts belong. The relay control RS is designed so that the two contacts ro and po can always be closed only alternatively. In the embodiment shown, it comprises an AND-gate SP, having a normal input that receives a control signal sPO, supplied to actuate (close) the contact po, and an inhibit input that receives a signal sRo supplied to actuate (close) the contact ro. The output of the AND-gate is applied through a resistor R1 to the base of a first transistor Tr1, whose collector circuit contains the winding of relay PO. The signal input for the signal sRO leads also via a resistor R2 to the base of a second transistor Tr2, whose collector circuit contains the winding of the other relay RO.

Normally, with the supply circuit closed via the hook switch of the subscriber Tln connected to the subscriber line, the contact po is closed and will open in this state only if a subscriber actuates a ground key for a prolonged time or if, according to the proposed operation mentioned above, an insulation test is to be carried out. Now, however, if connection of the device RG for call signal generation is to be effected—that is, if the signal sRO is applied to the relay control RS—the linkage condition of the AND-gate SP is no longer fulfilled and the transistor Tr1 will be cut off. As a result the relay winding PO loses its current and the contact po drops (opens).

At the same time, relay RO pulls up via the main current path of transistor Tr2, closing the contact ro. In this way, the DC voltage −UB, with a superimposed AC voltage (permanently or temporarily, depending on the type of call), is applied to the a-wire and can act on the bell or receiver of the subscriber Tln. Because of the open cutoff contact po, the then flowing call current is neither substantially impaired by the supply current delivered via the power supply bridge, nor can it dissipate via the capacitor C of the supply bridge, since the resistance Ri connected in parallel with the cutoff contact po is very high. After termination of the call phase when the signal sRO is eliminated, the signal sPO can again act on the base of the transistor Tr1 via the AND-gate SP, so that the relay PO pulls up and the contact po is closed again. As will be understood, the cutoff contact po thus supplements the coupling contact ro of device RG for call signal generation by virtue of the operation of the relay control RS; that is, it serves as a reversing switch.

There has thus been shown and described a novel subscriber line access circuit which fulfills all the objects and advantages sought therefore. Many changes, modifications, variations and other uses and applications of the subject invention will, however, become apparent to those skilled in the art after considering this specification and the accompanying drawing which discloses the preferred embodiment thereof. For example, whereas mechanical relay contacts are shown and described, electronic switches may be substituted in a manner known in the art. All such changes, modifications, variations and other uses and applications which do not depart from the spirit and scope of the invention are deemed to be covered by the invention which is limited only by the claims which follow.

I claim:

1. A telecommunications subscriber line access circuit for coupling a two wire subscriber station to a four wire interface to a system, said circuit comprising:
    (a) a two-to-four wire hybrid transformer;
    (b) a power supply bridge connected to the two wire side of said transformer for providing a potential difference across the two wires of said subscriber station, said power supply bridge including:
        (1) a first resistor connected between ground and a first winding of said transformer on the two wire side;
        (2) a second resistor connected between a source of potential and the second winding of said transformer on the two wire side; and
        (3) a capacitor connected between said first and second resistors on the sides thereof which are connected to said first and second windings;
    (c) an evaluating circuit connected to said first and second windings for producing and indicating signal upon ground key actuation of said subscriber;
    (d) a cutoff circuit arranged in the power supply bridge, in series with at least one of said first resistor and said second resistor, between said at least one resistor and the respective first and second winding of said transformer at the point at which said evaluating circuit is connected thereto, said cutoff circuit including:
        (1) a first cutoff switch which is opened, with a delay, upon ground key actuation and closed upon termination of ground key actuation; and (2) a third resistor bridging said cutoff switch and having a high resistance value;

(e) means having an output for producing a call signal at said output;

(f) means for coupling said output of said call signal producing means to one of said first and second windings of said transformer at the point at which said cutoff circuit is connected thereto, said coupling means including:

(1) a second cutoff switch; and (2) a fourth resistor connected in series with said second cutoff switch;

(g) means for controlling said first and said second cutoff switches such that only one of said switches is closed at a time.

2. The circuit defined in claim 1, wherein said cutoff circuit is arranged in series with said second resistor only.

3. The circuit defined in claim 1, wherein a separate cutoff circuit is arranged in series with both said first and said second resistor.

* * * * *